Sept. 4, 1934.  J. E. NEALE ET AL  1,972,630
PIPE TESTING APPARATUS
Filed Dec. 11, 1930   3 Sheets-Sheet 3

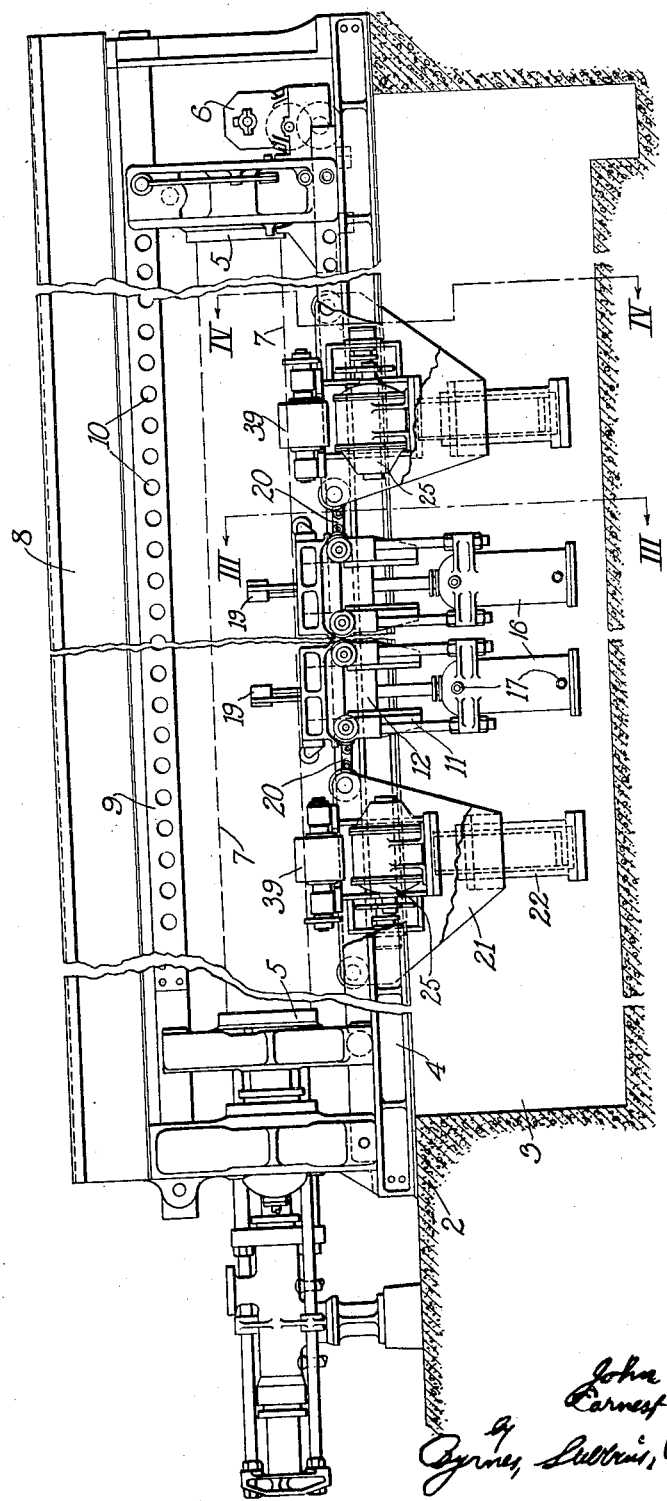

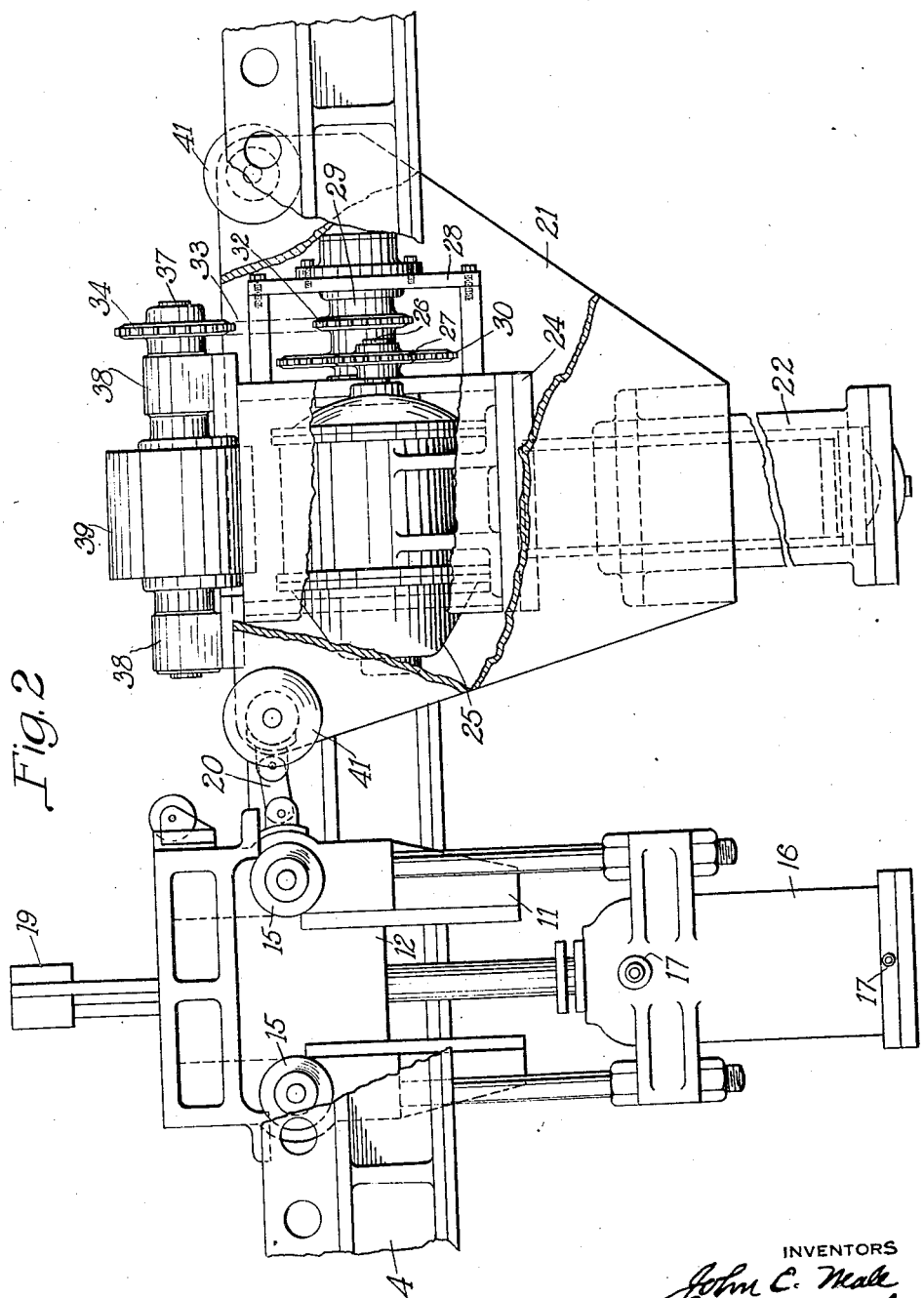

INVENTORS

Patented Sept. 4, 1934

1,972,630

UNITED STATES PATENT OFFICE 1,972,630

PIPE TESTING APPARATUS

John E. Neale, Girard, and Earnest W. Mishler, Youngstown, Ohio, assignors to The Youngstown Sheet & Tube Company, Youngstown, Ohio, a corporation of Ohio Application December 11, 1930, Serial No. 501,567

12 Claims. (Cl. 73—51)

The present invention relates broadly to the handling of materials and the supporting thereof for the performance of predetermined operations thereon, and more particularly to an apparatus especially useful for the turning of pipe during the testing operation.

One of the ordinary ways of testing a length of pipe, is to place such length between suitable heads of a testing machine with the ends of the pipes fitting against liquid-tight gaskets on such heads. Pressure is then applied to the inside of the pipe by some means such as water or other material having liquid like or flow characteristics. When water is used, it is desirable to place the machine over a pit to permit draining off of the water in case of bursting of the pipe. It is also desirable to position or turn the pipe in the testing machine so that the operator and inspectors can readily see any desired portion thereof, and especially the seam. In other cases, such as experimental tests, it may be desirable to so turn the pipe that the seam is at the bottom thereof and so located that in case of bursting, the water will pour directly into the pit.

It has heretofore been customary to roll a length of pipe into a testing machine, center the same therein in line with the heads, and thereafter effect rotation by means of pinch bars or the like. This not only requires at least one extra operator at each end of the pipe, but it is extremely slow, and in case of large pipe sizes, extremely dangerous.

The present invention has for one of its objects the provision of a testing machine of improved construction with respect to its ability to effect rotation of a pipe length into any desired position about its longitudinal axis whereby any desired portion thereof may be brought into any required position either from the standpoint of ease of inspection or safety in case of bursting.

In the accompanying drawings we have shown for purposes of illustration only, a preferred embodiment of the present invention. In the drawings:

Figure 1 is a side elevational view of one form of testing apparatus constructed in accordance with the present invention;

Figure 2 is a side elevational view on an enlarged scale, of the centering, elevating and rotating unit;

Figure 4:
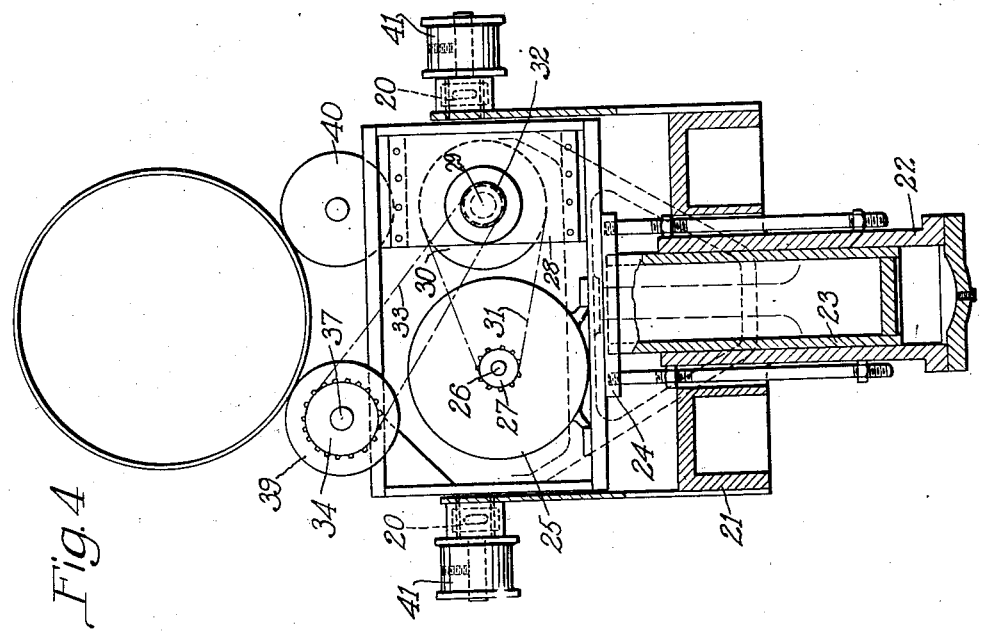
Figure 4 is a transverse sectional view on an enlarged scale along the line IV—IV of Figure 1, looking in the direction of the arrows, a portion of the mechanism being illustrated in section.
Figure 3:
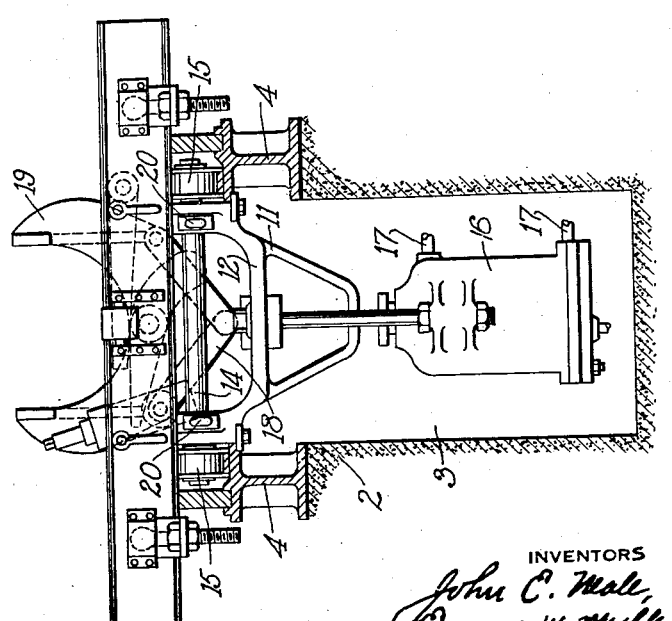
Figure 3 is a transverse sectional view on an enlarged scale along the line III—III of Figure 1, looking in the direction of the arrows.

The present invention is not limited to any specific form of testing apparatus, but is adapted to testers generally. For purposes, however, of a better understanding of the invention, there is illustrated in the drawings somewhat diagrammatically one form of standard pipe testing machine.

A testing apparatus of the usual construction comprises a suitable foundation 2 in which is provided a pit 3. On the foundation on opposite sides of the pit are positioned tracks 4 of suitable construction. These tracks at their ends cooperate with heads 5 shaped to cooperate with the ends of the pipe to be tested. Either one or both of the heads may be movable or adjustable, Figure 1 of the drawings illustrating the head 5 at the right hand end of the rails as being provided with a motor 6 for driving the same to any desired position along the rails. Such adjustment or movement is obviously for the purpose not only of accommodating the apparatus to pipes of different lengths, but for effectively clamping the ends of the pipes and providing a fluid-tight joint therewith. In Figure 1 there is illustrated in broken lines 7 a pipe in position between the heads.

Also extending between the heads 5 is a beam 8 below which extends a stringer 9 provided with a series of openings 10 for the attachment of air hammers or the like for the purpose hereinafter referred to.

Cooperating with the tracks 4 and adapted to travel therealong is any desired number of carriages 11. Each of these carriages includes a suitable framework 12 in which are journaled axles 14 carrying track wheels 15. Suspended from the framework is a cylinder 16 having suitable fluid inlet and outlet connections 17 by means of which the piston therein (not shown) may be raised or lowered. Each piston rod in turn cooperates with a system of links 18 effective for operating clamps 19 adapted to cooperate with the periphery of a pipe in position in the machine and center the same.

In accordance with usual practice, the pipe to be tested is rolled from a suitable skidway into the testing machine, and the clamps 19 are actuated for centering the same, the clamps being effective for positioning the pipe in such manner that the heads 5 upon movement toward the ends thereof will accurately engage and seal the same.

Connected to each of the carriages 11 by a suitable link 20 is a framework 21 carrying elevating and turning mechanism. This mechanism comprises a cylinder 22 generally similar to the cylinder 16, within which works a piston rod 23. The upper end of this piston rod supports a motor base 24 whereby the motor base and its associated parts may be raised and lowered. Mounted on the motor base is a motor 25, the armature shaft 26 of which carries a sprocket 27. Mounted adjacent the motor 25 is a bearing 28 within which is journaled a shaft 29. Secured to this shaft is a sprocket 30 driven by the armature sprocket 27 through the medium of a chain 31.

Also secured to the shaft 29 for rotation with the sprocket 30 is a second sprocket 32 with which cooperates a sprocket chain 33 for driving a sprocket 34. The sprocket 34 is secured to a roller shaft 37, journaled in bearings 38 on the frame 21, and carries a roller 39 of suitable construction and preferably provided with a covering of rubber or other friction material. By reason of this construction it will be apparent that when the motor 25 is energized, the roller 39 will be driven. This roller is so positioned as to lie on one side of the axis of a pipe in position in the testing apparatus as illustrated in Figure 4. Adapted to cooperate with the pipe on the opposite side of the axis is a second roller 40 similar to the roller 39 with the exception that no driving means therefor is provided.

The sides of the frame 21 have secured thereto track wheels 41 adapted to cooperate with the tracks 4 before described.

With an apparatus utilized for the testing of short lengths of pipe, a single centering means with its associated mechanism for raising and turning the pipe may be provided. With a testing apparatus of greater capacity, however, it may be necessary to provide two or more complete mechanisms of this character. In such cases, the mechanism similar to that illustrated in Figure 4 will be provided for cooperation with each of the carriages 11, although it is not necessary that a motor 25 be provided for each of the elevating mechanisms.

In operation, a pipe having been rolled into position in the manner described and having been properly centered by the centering clamps 19, is ready to be turned to the position desired to facilitate inspection or testing. To this end fluid is admitted to all of the cylinders 22 to raise the motor bases 24 and to bring the rollers 39 and 40 into engagement with the pipe. This engagement having been effected, the clamping arms 19 may be released, and the motor or motors 25 energized for rotating the pipe to the desired position. Rotation having been completed, the motor or motors may be de-energized, the clamps 19 actuated for gripping the pipe, the platforms 24 lowered and the heads 5 moved into engagement with the ends of the pipe. At this time the pipe is ready to have the testing fluid admitted thereto in any well known manner.

The advantages of the present invention arise from the provision of a testing apparatus having means for centering a piece of pipe therein together with means for elevating or sustaining a length of pipe and rotating the same. To this end the axes of the rollers 39 and 40 extend in substantial parallelism to the axis of the pipe being tested in such manner as to engage the periphery thereof at spaced points and effectively support the same during rotation. It will further be apparent that the position of the rollers is such as to maintain the pipe in substantially central position during rotation thereof, whereby the subsequent operation of the clamping arms 19 for final centering purposes is facilitated.

The section of pipe having been tested, the clamping arms 19 may be released and the pipe length rolled out of the apparatus onto a suitable platform or series of skids provided for that purpose.

It will be understood that the carriages 11 together with the carriages 21 are simultaneously adjustable to different positions lengthwise of the tracks which support the same, thereby permitting them to be so adjusted as to more effectively cooperate with the pipe, this movement of the carriages lengthwise of the frame enabling the individual elevating mechanisms to have the weight of the pipe more evenly distributed therebetween.

During the testing operation it is desirable in certain cases to subject the pipe to a series of hammer-like blows. This may be done by suspending air hammers from the stringer 9 as before described.

While we have herein illustrated and described a preferred embodiment of the present invention, it will be understood that changes in the construction, arrangement and operation of the parts may be made without departing from the spirit of the invention or the scope of our broader claims.

We claim:—

1. In a pipe testing apparatus, testing heads, a trackway between said heads, a carriage movable lengthwise of said trackway, and pipe elevating means supported by said carriage.

2. In a pipe testing apparatus, testing heads, a trackway between said heads, a carriage movable lengthwise thereof, pipe elevating and supporting means on said carriage, and means for rotating said supporting means to effect rotation of a pipe supported thereby.

3. In a pipe testing apparatus, testing heads, a trackway between said heads, a carriage movable along said trackway, pipe supporting rollers carried thereby, and means for raising and rotating said rollers.

4. In a pipe testing apparatus, testing heads, clamping means for centering a pipe in testing position between said heads, and pipe turning means including a plurality of rollers having their axes extending substantially parallel to the axis of a length of pipe to be tested.

5. In a pipe testing apparatus, testing heads, clamping means for centering a pipe in testing position between said heads, and pipe turning means including a plurality of rollers having their axes extending substantially parallel to the axis of a length of pipe to be tested, there being means for rotating said rollers.

6. In a pipe testing apparatus, a trackway, a carriage cooperating therewith, centering means carried by said carriage, a second carriage secured to said first mentioned carriage, and pipe elevating and turning means on said second carriage.

7. In a pipe testing apparatus, a frame, heads adjacent each end thereof for cooperation with the ends of a length of pipe being tested, centering means cooperating with said frame for centering a pipe section therein relatively to said heads, and means associated with said centering means for rotating a pipe section.

8. In a pipe testing apparatus, a frame, heads adjacent each end thereof for cooperation with the ends of a length of pipe being tested, centering means cooperating with said frame for centering a pipe section therein relatively to said heads, and means associated with said centering means for elevating and rotating a pipe section.

9. The combination with a pipe testing apparatus, of a plurality of rollers movable in a direction substantially normal to the axis of the pipe being tested, and means movable with the rollers for elevating said rollers and rotating the same while in elevated position.

10. The combination with a pipe testing apparatus including a pair of testing heads, of means for adjusting the position of one of said heads in a direction axially of a pipe to be tested, pipe supporting rollers intermediate said heads, means for bringing said rollers into engagement with a pipe section, and means for rotating said rollers.

11. The combination with a pipe testing apparatus including a pair of testing heads, of means for adjusting the position of one of said heads in a direction axially of a pipe to be tested, pipe supporting rollers, means for adjusting said rollers in a direction axially of a pipe to be tested, means movable with said rollers for bringing the same into engagement with a pipe section in any axially adjusted position, and means for rotating said rollers.

12. The combination with a pipe testing apparatus having a pair of testing heads, of a trackway extending between said heads, means on said trackway for laterally engaging a pipe between said heads for centering said pipe relative to said heads, and means on said trackway for elevating and rotatably supporting the pipe.

JOHN E. NEALE.
EARNEST W. MISHLER.